United States Patent
Nishiyama et al.

(10) Patent No.: US 8,211,573 B2
(45) Date of Patent: Jul. 3, 2012

(54) MULTILAYERED CONDUCTIVE SHEET AND ELECTRODE

(75) Inventors: Masakazu Nishiyama, Kurashiki (JP); Eiichi Ishida, Kurashiki (JP); Yoshiaki Yasuda, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/226,010

(22) Filed: Sep. 6, 2011

(65) Prior Publication Data

US 2011/0318642 A1    Dec. 29, 2011

Related U.S. Application Data

(63) Continuation of application No. PCT/JP2010/052887, filed on Feb. 24, 2010.

(30) Foreign Application Priority Data

Mar. 9, 2009  (JP) .................................. 2009-054468

(51) Int. Cl.
*H01M 4/80*  (2006.01)
(52) U.S. Cl. .................... 429/235; 429/233; 429/236
(58) Field of Classification Search .................. 429/235, 429/236, 233
See application file for complete search history.

(56) References Cited

U.S. PATENT DOCUMENTS

| 5,434,024 | A | 7/1995 | Ikeda et al. |
| 7,407,727 | B2 | 8/2008 | Sugiyama et al. |
| 2003/0165741 | A1* | 9/2003 | Maly-Schreiber et al. ... 429/235 |
| 2004/0043294 | A1 | 3/2004 | Fukui et al. |
| 2009/0042097 | A1* | 2/2009 | Fujikawa et al. ............. 429/129 |
| 2009/0263642 | A1 | 10/2009 | Handa et al. |

FOREIGN PATENT DOCUMENTS

| JP | 06-349481 | 12/1994 |
| JP | 2002-260637 | 9/2002 |
| JP | 2002-313326 | 10/2002 |
| JP | 2004-127561 | 4/2004 |
| JP | 2004-193062 | 7/2004 |
| JP | 2004193062 A * | 7/2004 |
| JP | 2005-347147 | 12/2005 |
| JP | 2007-122927 | 5/2007 |
| JP | 2008-028258 | 2/2008 |
| JP | 2008-198470 | 8/2008 |

OTHER PUBLICATIONS

International Search Report issued Apr. 20, 2010 in PCT/JP2010/052887 filed Feb. 24, 2010.

* cited by examiner

*Primary Examiner* — Barbara Gilliam
*Assistant Examiner* — Zachary Best
(74) *Attorney, Agent, or Firm* — Oblon, Spivak, McClelland, Maier & Neustadt, L.L.P.

(57) ABSTRACT

The present invention provides a conductive sheet having a surface resistance of 10 Ω/sq or lower on both surfaces, the conductive sheet comprising a sheet (A) and a sheet (B) laminated to the sheet (A), the sheet (A) having an apparent specific gravity of 0.05 g/cm$^3$ to 0.50 g/cm$^3$ and being formed from fibers having a diameter within the range between 3 and 20 μm, and the sheet (B) being formed from fibers having a diameter of 3 μm or smaller. The sheet (A) may be a fibrous material comprises an organic polymer fiber as its main component.

15 Claims, No Drawings

MULTILAYERED CONDUCTIVE SHEET AND ELECTRODE

CROSS REFERENCE TO THE RELATED APPLICATIONS

This application is a continuation application, under 35 U.S.C. §111(a), of international application No. PCT/JP2010/052887, filed Feb. 24, 2010, which claims priority to Japanese Patent Application No. 2009-054468, filed Mar. 9, 2009, the entire disclosure of which is herein incorporated by reference in their entirety into this application.

FIELD OF THE INVENTION

The present invention relates to a conductive sheet useful as components of storage devices such as, for example, lithium ion secondary batteries and electric double layer capacitors, and also to an electrode comprising such a conductive sheet including active material therein.

BACKGROUND ART

In the course of the battle against global warming, attentions are increasingly focused on storage devices such as, for example, lithium ion secondary batteries and electric double layer capacitors, for use in electric regeneration and output smoothing of solar batteries, wind power generations or the like, or for use as alternatives to a power itself. In consonance therewith, extensive studies have been made in various fields of industries on availability of increased output and capacity of the storage device.

Of those fields, particularly in the field of study on negative electrodes used in lithium ion secondary batteries, attentions have hitherto been centered not only on a carbon material such as, for example, graphite that is used generally as a standard material for the negative electrode, but also on a negative electrode material containing, in the active material, an element capable of increasing the capacity of the negative electrode, such as silicon or tin. Those materials for negative electrodes have a tendency to exhibit expansive behavior as they absorb lithium ions and do hence involve possibilities that particulate active materials may collapse, and that an active material layer may separate from the electrode collector layer. Since this absorption may reduce the conductivity of the negative electrode, techniques for suppressing those problems have been keenly desired for.

By way of example, Patent Document 1 listed below discloses a negative electrode or anode prepared by sintering a mixture of a particulate active material containing silicon with a conductive powdery metal on a surface of the electrode collector element under non-oxidizing atmosphere. In the practice of the preparation disclosed in this Patent Document 1, a metal foil or conductive powdery metal forming the electrode collector element is employed in the form of copper or a copper alloy.

It has, however, been found that the negative electrode prepared according to Patent Document 1 employing sintering process generates a Cu—Si compound that is electrochemically non-reactive with lithium, resulting in reduction in capacity of the negative electrode. Also, since the sintering is required to be performed at high temperature, there is a possibility that the copper used for the electrode collector element comes to melt or harden. Once such a phenomenon occurs, the flexibility required for the electrode collector element will be lost, thus posing a problem to be encountered with during the preparation of electrodes.

Patent Document 2 listed below discloses a negative electrode comprising a thin film formed on an electrode collector element, the thin film being made of a metal of a kind capable of being alloyed with lithium or an alloy containing such alloyable metal, and the electrode collector element being made of a material of a kind incapable of being alloyed with lithium. In the preparation of the negative electrode disclosed in Patent Document 2, the photoresist technique and the electroplating technique are employed to form an anode active material layer having a selective concave-convex pattern on the electrode collector element so that pores in the anode active layer formed into columnar shapes may accommodate a volumetric expansion of the anode active materials to thereby avoid an undesirable corruption of the active materials.

It has, however, been found that in order to prepare the negative electrode of the structure discussed above, preparation of a photoresist mask is needed for patterning the anode active material layer. This complicated preparation does indeed pose such a problem as to limit the productivity.

On the other hand, there has hitherto been known of an electrode element, in which a paste prepared by kneading a binder, an active material and a conductive agent together is coated on an electrode collector foil. In the preparation of this electrode, however, a sophisticated selection of a particular binder in consideration of types and characteristics of the active material and/or the conductive material are required. Further, a high level technique is also required to increase the uniformity as well as the density of the electrode enough to encounter difficulties. As a result, the characteristics of the active material have not been fully developed.

In contrast thereto, Patent Document 3 listed below suggests an electrode for use in a lithium battery, which comprises a support and an active material paste borne on the support, wherein the support is formed by depositing (or plating) a metal on a three-dimensional network plastic substrate having internal open cell by means of an arc-ion plating process, and the active material paste is a mixture of the electrode active material and a conductive agent, kneaded together with the use of a binding agent. Patent Document 3 describes the preparation of the electrode by filling or applying the active material in or to the support. Thereby, the electrode disclosed in Patent Document 3 achieves that the amount of each of the binding agent and the conductive agent to be used in preparation of the electrode can be reduced as compared with the use of a metal thin plate as an electrode substrate and that improved adhesion between the electrode substrate and the active material is effective to improve cell performance characteristics such as, for example, repeatable charge-discharge cycle, discharge electric capacity and electrical power output.

However, the plastic support containing the active material is alleged to preferably have a pore size within the range of about 50 to 100 μm. Since such plastic support must have a low density to enclose a sufficient amount of active material, the density of the electric current available from the conductive substrate tends to become low, resulting in increase in internal resistance.

Patent Document

[Patent Document 1] JP Laid-open Patent Publication No. 2002-260637

[Patent Document 2] JP Laid-open Patent Publication No. 2004-127561

[Patent Document 3] JP Laid-open Patent Publication No. H06-349481

DISCLOSURE OF THE INVENTION

Problems to be Solved by the Invention

In view of the foregoing, the present invention has for its object to provide a conductive sheet which enables to use an active material formed from a carbon material, as well as to use a negative-electrode active material having high capacity, such as highly expansive silicon, and enables to enlarge the charge (or power) collecting property from the active material, and the electrode formed from this conductive sheet.

Another object of the present invention is to provide a conductive sheet which can improve productivity drastically compared with the conventional approach, and an electrode formed from this conductive sheet.

Means of Solving the Object

As a result of intensive studies conducted by the inventors of the present invention to achieve the above purposes, the inventors have finally found as follows. That is, by the use of a conductive sheet which comprises a conductive sheet (A) and a conductive ultrafine fiber sheet (B) laminated to the conductive sheet (A), since the sheet (A) is formed from fibers of specific fiber diameters and having a specific apparent specific gravity and the sheet (B) is formed from the ultrafine fibers having specific fiber diameters, it has achieved that:

(i) the conductive sheet has a three-dimensional network of entangled conductive fibers in both the sheets (A) and (B) and enables to secure a conductive path everywhere in the whole electrode layer;

(ii) the conductive sheet makes a contribution to stress relaxation of active material having high volumetric expansion; and (iii) the conductive sheet can improve the charge collecting property due to the ultrafine fiber sheet (B); and this invention was completed on the basis of these findings.

That is, the present invention provides a conductive sheet having a surface resistance of 10 Ω/sq (Ω/square) or lower on both surfaces, the conductive sheet comprising a sheet (A) and a sheet (B) laminated to the sheet (A), the sheet (A) having an apparent specific gravity of 0.05 g/cm$^3$ to 0.50 g/cm$^3$ and being formed from fibers having a diameter within the range between 3 and 20 μm, and the sheet (B) being formed from fibers having a diameter of 3 μm or smaller.

For example, the above-mentioned sheet (B) may be a sheet formed from an electrically conductive nonwoven fabric, and the electrically conductive nonwoven fabric may comprise a nonwoven fabric comprising an organic polymer as its main component and formed by electro-spinning method or meltblown method.

The organic polymer which mainly constitutes such a sheet (B) may be at least one member selected from the group consisting of polyvinylidene fluorides, polyamides, polypropylenes, polyesters, and polyacrylonitriles. Moreover, the sheet (A) may be a fibrous material formed from an organic polymer fiber as its main component.

Moreover, the sheet (B) may have a greater apparent specific gravity than the sheet (A).

This invention also includes an electrode at least comprising active material and the above-mentioned conductive sheet, wherein (i) the active material is filled in pores between constituent fibers in at least sheet (A), (ii) the active material coats constituent fibers of at least sheet (A); or (iii) the active material is included in the electrode in the way of both (i) and (ii).

The active material may be, for example, particulate active materials, and the particulate active materials may be directly loaded (or fed) between constituent fibers of the at least sheet (A).

Moreover, the active material may coat constituent fibers of the at least sheet (A) by vapor deposition (or evaporation).

Such an active material may be, for example, a negative-electrode active material being capable of storing and emitting lithium ions. The active material may, for example, comprise at least one member selected from the group consisting of carbon materials, silicon (or elementary silicon), silicon compounds, tin (or elementary tin), tin compounds, and germanium compounds.

Such an electrode is applicable to lithium secondary batteries as well as electric double layer capacitors.

Further, the present invention also includes a conductive sheet having a surface resistance of 10 Ω/sq or lower on both surfaces, the conductive sheet comprising a sheet (A) and a sheet (B) laminated to the sheet (A), the sheet (A) having an apparent specific gravity of 0.05 g/cm$^3$ to 0.40 g/cm$^3$ and being formed from fibers having a diameter of larger than 3 μm and not larger than 20 μm, and the sheet (B) being formed from fibers having a diameter of 3 μm or smaller, and the fiber diameter of fibers in the sheet (B) being smaller than that of fibers in the sheet (A).

It is to be noted that the fiber diameter herein referred to means a fiber diameter measured or calculated according to the method described later in the item of EXAMPLES.

Effect of the Invention

According to the conductive sheet of the present invention, since the sheet (A), having a specific apparent specific gravity and being formed from fibers which has a specific fiber diameter, is laminated to the ultrafine fiber sheet (B) formed from ultrafine fibers having a specific fiber diameter, the conductive sheet has a three-dimensional network of entangled conductive fibers in both sheets (A) and (B) and can achieve to produce conductive paths everywhere in the whole electrode layer. Therefore, the conductive sheet can provide the following effects.

1) Even without a binder and an auxiliary conducting agent, an electrode comprising such a conductive sheet can increase discharge capacity as well as achieve reduction in electric resistance inside the electrode because of enlarged amount of active material to be contained.

2) The conductive sheet can make a contribution to stress relaxation of active material having high volumetric expansion, and thereby can inhibit collapse or exfoliation of the active material. Moreover, the conductive sheet can secure electrical connections therein even if the active material may collapse, resulting in improvement in cycle characteristics of batteries.

3) Further, the conductive sheet of the present invention has the sheet (B) as a conductive ultrafine fiber layer comprising fibers of the specific diameters, resulting in high density of the fibers in the sheet (B). Such a conductive sheet makes it possible to enlarge the charge collecting property, as well as to omit current collector foils, such as copper foils. Furthermore, since the ultrafine fiber layer of the sheet (B) has high density, the ultrafine fiber layer enables to prevent the loss of active material from the conductive sheet during filling the conductive sheet with the active material from the side of the sheet (A), as well as during using the electrode comprising the conductive sheet.

In particular, since the sheet (B) comprising a nonwoven fabric formed by electro-spinning method or meltblown method has a higher fiber density in the sheet (B), the charge collecting property of the sheet (B) is enlarged. Further, the usage of the nonwoven fabric makes it possible to laminate the sheet (A) to the sheet (B) by thermal compression bonding to omit adhesives required for the laminating of the sheets.

Moreover, usage of specific organic polymers to constitute the sheet (B) enables to form the ultrafine fiber layer by electro-spinning method or meltblown method, and such organic polymer gives the chemical stability to electrolytes and the like.

Furthermore, when the fibers of the sheet (A) comprise an organic polymer as its main component, the conductive sheet comprising such a sheet (A) is excellent in flexibility. Accordingly, such a conductive sheet can effectively relax the stress from the active material even having high volumetric expansion.

Moreover, when the conductive sheet is filled with particulate active materials to obtain an electrode, the sheet (B) having a greater apparent specific gravity than the sheet (A) can be used effectively to prevent the loss of the active materials from the conductive sheet, thereby enabling to fill the conductive sheet with particulate or powdery active materials directly. Accordingly, the process simplification can be achieved in electrode manufacture.

Moreover, since the electrode of the present invention comprising the conductive sheet and an active material, and the active material is to be used either for filling pores between constituent fibers in at least sheet (A) or for coating constituent fibers of at least sheet (A), such an electrode enables to relax the stress of active materials effectively and to inhibit collapse and exfoliation of the active materials. Further, even if the active material collapsed, since the electrode can still secure electrical connections therein, cycle characteristics can be improved in such a situation.

In particular, in some types of electrodes of the present invention, the conductive sheet in the electrodes can be directly filled with particulate active materials, thereby it is possible not only to improve the cushioning properties of the conductive sheet to the active materials, but also to increase the amount of the active materials to be contained in the conductive sheet.

On the other hand, the active materials may coat constituent fibers in the conductive sheet by means of vapor deposition so as to provide an electrode having less leakage of the active material and enlarging the effect of the active material. As a result, the electrode having higher performance can be realized.

When the active material comprises a negative-electrode active material capable of storing and emitting lithium ions, such as carbon materials, silicon or silicon compounds, tin or tin compounds, and germanium compounds, such an electrode makes it possible, for example, to increase the negative electrode capacity of lithium secondary batteries and to improve the cycle characteristics of the batteries.

DETAILED DESCRIPTION OF EMBODIMENTS

Some embodiments of the present invention herein are described in more detail. One embodiment of the present invention is a conductive sheet comprises a conductive sheet (A) and a conductive sheet (B) laminated to the sheet (A), the sheet (A) having an apparent specific gravity of 0.05 g/cm$^3$ to 0.50 g/cm$^3$ and being formed from fibers having a diameter within a specific range, and the sheet (B) being formed from ultrafine fibers. The fibrous materials in the both sheets (A) and (B) form a three-dimensional network of entangled fibers.

The above-mentioned fibrous materials are not limited to a specific one, and examples of the fibrous material include materials having morphological stability as fiber and having conductivity, for example, organic materials, glasses, metal materials, and the like.

[Sheet (A)]

The sheet (A) which constitutes the conductive sheet of the present invention may have a function as a container mainly including active material therein. The sheet (A) may comprise fibers having a diameter within the range of 3 μm and 20 μm, preferably a diameter of larger than 3 μm and not larger than 20 μm, more preferably a diameter within the range of 4 μm and 15 μm, and especially preferably a diameter within the range of 4 μm and 10 μm. Moreover, the fiber diameter of the sheet (A) may exceed 3 μm.

In the case where the diameter of each fiber is too small (for example, smaller than 3 μm), the sheet comprising such fibers may have too high density, resulting in small pores surrounded by fibers. Such a sheet is inconvenient because of insufficient amount of the active materials to be contained. Conversely, when the diameter of each fiber is too large (for example, larger than 20 μm), the sheet formed from such fibers may have sparse conductive path because the number of fibers may be too small in the sheet. Thereby, the effect of decreasing the internal resistance in the electrode may be reduced. Otherwise, when the expansive active material collapses, electrical connection in the electrode may be failed.

The apparent specific gravity of the sheet (A) needs to be within the range between 0.05 and 0.5 g/cm$^3$, preferably between 0.05 and 0.4 g/cm$^3$, and more preferably between 0.1 and 0.3 g/cm$^3$. When the apparent specific gravity of the sheet (A) exceeds 0.5 g/cm$^3$, such a sheet (A) has a low proportion of pores therein, resulting in containing too reduced amount of active material so as not to achieve, for example, sufficient performance as a storage device. When the sheet (A) has an apparent specific gravity of lower than 0.05 g/cm$^3$, such a sheet has a reduced handling ability and is not desirable.

In the case where the conductive sheet is to be filled with active materials, a sheet (A) having a lower specific gravity and being thicker is sometimes more advantageously used in the conductive sheet because filling such sheet with active material is easier to operate. Moreover, it is desirable that the sheet (A) has an apparent specific gravity of 0.1 g/cm$^3$ or higher.

It should be noted here in the present specification that the apparent specific gravity of the sheet (A) can also be evaluated as a fiber volume content. In such a case, the fiber volume content may be expressed as the volume of the fibers relative to the whole sheet volume (A) (volume %), and, specifically, it may be converted as the following formula:

(Apparent specific gravity of Sheet A)/(Fiber density in Sheet A)×100.

In addition, the fiber volume content can also be measured according to JIS K 7075, and the fiber volume content of the sheet (A) may be about 3.5 to 40%, preferably about 5 to 30%, and more preferably about 7 to 25%.

The thickness of the sheet (A) may be preferably 10 μm or greater, more preferably 20 μm or greater, and still more preferably 30 μm or greater. The sheet being too thin (for example, having a thickness of smaller than 10 μm) may have insufficient sheet strength and rigidity, resulting in deterioration in handling ability and workability. Further, such a conductive sheet may contain a reduced amount of active material to be supported therein. It should be noted that, although the upper limit of the thickness of the sheet (A) can be suitably selected depending on the amount of active material to be filled or others, the sheet (A) thickness may be, for example, 300 μm or smaller, and preferably 200 μm or smaller.

Non-limiting examples of the methods for producing the sheet (A) which constitutes the conductive sheet of the present invention include the following methods (1) to (5) and others.

(1) a method comprising the steps of: producing a fibrous material from a conductive polymer; and shaping the fibrous material into a sheet, such as a paper, a nonwoven fabric and a textile, to obtain a conductive fibrous-material sheet, (2) a method comprising the steps of: mixing a conductive filler into a non-conductive polymer; and producing a fibrous material from the obtained conductive-filler-mixed polymer, and shaping the fibrous material into a sheet, such as a paper, a nonwoven fabric and a textile, to obtain a conductive sheet, (3) a method comprising the steps of: shaping a fibrous material formed from non-conductive polymer, or glass fiber into a sheet, such as paper, a nonwoven fabric, and a textile; forming a conductive metal layer on the surface of the fibrous material or glass fiber sheet by impregnating the sheet with a conductive coating agent, by coating the sheet with a conductive coating agent, by metal plating the sheet, by vapor depositing the sheet, or the like to obtain a conductive sheet, (4) a method comprising the steps of: producing a fibrous material from a carbonizable organic polymer; shaping the fibrous material into a sheet, such as a paper, a nonwoven fabric and a textile; and carbonizing, if necessary activating, the fibrous-material sheet to obtain a conductive sheet, or a method comprising the steps of: producing a fibrous material from a carbonizable organic polymer; carbonizing, if necessary activating, the fibrous material to form a carbonized fibrous material; and shaping the carbonized fibrous material into a sheet, such as a paper, a nonwoven fabric and a textile, to obtain conductive sheet, (5) a method comprising the steps of: shaping a fibrous metal into a sheet, such as a paper, a nonwoven fabric and a textile to obtain a conductive sheet, and others, for example, the method comprising a step of: producing a bundle of fibrous materials from non-conductive polymer; forming a conductive metal layer on the surface of the fiber bundle; and shaping the bundle into a sheet.

The above-described fibers (1) to (4) may be obtained, depending on the polymer to be used, by known methods, such as melt spinning, wet spinning, and dry spinning, and the obtained fibers may be formed into a sheet, such as a paper, a nonwoven fabric, and a textile. In order to adjust fineness of the fiber, it is also possible to perform composite or blend spinning of different polymers to obtain a composite fiber or a sea-island fiber, and subsequently to split the obtained fiber or to remove one component from the sea-island fiber by dissolution.

Moreover, a sheet can be also obtained by spunbonding method or meltblown method successively after spinning step.

The species of conductive polymers used in the method (1) are not limited to a specific one as long as they provide a conductive sheet having a surface resistance within the specific range as described above, and preferable conductive polymers include conductive organic polymers, such as polyanilines, polyethylenedioxy thiophenes, polythiophenes, polybenzothiophenes, polyimidazoles, polybenzoimidazoles, polyparaphenylenes, and polypyrroles.

The species of non-conductive polymers used in the above method (2) or (3) are not particularly limited to a specific one as long as they are organic polymer capable of forming a fibrous material, and examples of the non-conductive polymers may include polyesters, polyamides, polyacrylonitriles, polyvinyl chlorides, polyvinyl alcohols, ethylene vinyl acetate copolymers, polysulfones, polyethylenes, polypropylenes, polyvinylidene fluorides, and the like. Among them, polyesters and polypropylenes are especially desirable.

These conductive or non-conductive organic polymers could be either homopolymers or copolymers (including graft or block copolymers), or may be a modified polymer comprising a reactive functional group such as carboxylic group and epoxy group. Further, polymer blends including two or more kinds of these polymers can also be used. For example, these polymer materials can be dissolved in a suitable solvent, and a fibrous material can be produced by solution spinning.

In such a case, the fibrous material is generally formed from an organic polymer and comprises the polymer as its main component. That is, the fibrous material comprises the organic polymer in the proportion of 50% or more, preferably 80% or more. If necessary additives such as conductive filler and others are included in the fibrous material as other constituents.

In the above method (2), conductive fillers are mixed in a non-conductive organic polymer. The species of the fillers are not limited to a specific one as long as they give the non-conductive organic polymer a desired conductivity, and examples of the fillers may include graphites, carbon blacks, carbon nanotubes, metal powders, aluminum pastes, powders of zinc white or copper sulfide, and others. As a method for mixing conductive fillers with a non-conductive organic polymer, there may be described, for example, a method comprising the steps of: adding conductive fillers to a polymer solution; and mixing and stirring them during preparing the polymer solution, a method comprising the steps of: adding conductive fillers to a non-conductive organic polymer during melt extruding the polymer; mixing the conductive fillers with the polymer to obtain a polymer chip, and using the polymer chip as a raw material to obtain a spinning liquid, and other methods.

It should be noted that in the above method (1), these fillers may be mixed with a conductive polymer to produce a fibrous material.

In the above method (3), conductivity is imparted to the fibrous-material sheet comprising a non-conductive polymer or glass fiber. The method to impart conductivity is not limited to a specific one as long as the conductivity method imparts the above-mentioned surface resistance to the obtained fibrous-material sheet, and examples of the method include, for example, impregnating the fibrous material with a conductive coating agent, coating the fibrous material, metal plating the fibrous material, vapor deposition of the fibrous material, and others.

The species of the conductive coating agent used for impregnating or coating is not limited to a specific one, and the preferable conductive coating agents may include coating agents comprising a conductive component, such as metal powders and carbons, and an adhesive resin component, such as acrylic resins, epoxy resins and vinyl resins, both of the components being dissolved or dispersed in an organic solvent or water. The coating method may be any of known or conventionally used methods. The thickness of the coating layer to fiber may be, for example, about 0.1 to 10 μm, preferably about 0.5 to 5 μm, and more preferably about 1 to 4 μm.

In the above-mentioned metal plating, conductive metals, such as nickel, copper, silver, iron, and aluminum, are used for plating. As the metal plating method, there may be mentioned a known electrolytic or non-electrolytic method. For example, when plating by means of the electrolytic method, preferable plating method includes, but is not limited to, watt bathes for nickel plating, copper sulfate solutions for copper plating, silver cyanide solutions for silver, a ferrous sulfate solutions for iron plating. The thickness of metal plating may be adjusted so that a surface resistance may be within the above-mentioned range. The thickness of metal plating, for example, may be about 0.1 to 10 μm, preferably about 0.2 to 3 μm, and more preferably about 0.2 to 2.5 p.m.

Metals which have conductivity can be used for the above-mentioned vapor deposition, and examples of the metal may include copper, aluminum, nickel, iron, gold, silver, tungsten, chromium, and titanium, or their alloys, and preferable metal can be selected depending on the intended application of products. For example, copper, nickel, or a copper-nickel alloy is particularly preferably used for lithium-ion secondary batteries, and aluminum is particularly preferably used for electric double layer capacitors. As the vapor deposition method, there may be suitably used, depending on the purpose, sputtering method, physical vapor deposition method (PVD), plasma-enhanced chemical vapor deposition (PECVD), thermal chemical vapor deposition method, ion beam evaporating method, vacuum deposition technique, electron beam vapor deposition method and others. In addition, after vapor-depositing one surface of a sheet, the other surface of the sheet may be vapor-deposited, or double-sided vapor deposition may be performed at one time. The thickness of the deposited layer may be, for example, about 0.1 to 10 μm, preferably about 0.2 to 3 μm and more preferably about 0.2 to 2.5 μm.

In the above method (4), examples of the carbonizable organic polymers to be used may include carbonizable organic polymers having fiber forming properties, such as polyvinyl alcohols, polyacrylonitriles, and phenol resins, and others. Various additives, such as acids, metal chlorides, and iodine, may be added in order to carbonize these carbonizable organic polymers effectively under an inert atmosphere, if needed to activate the carbonizable organic polymers to raise carbonization efficiency. The range of the processing temperature for carbonization is, for example, 600 to 2000° C. An activated carbon fibrous-material sheet with a greater specific surface area can also be formed by performing a steam activation, a carbon-dioxide-gas activation, or others at a temperature of 600° C. or higher after carbonization.

In the above method (5), as a method of obtaining a fibrous metal material, there may be mentioned a method of directly using a commercially available metal fine wire, a method comprising the steps of: preparing a composite comprising a solvent-soluble polymer and a conductive material; and then removing the polymer from the composite by dissolving the polymer with a solvent or others, wherein the composite is obtained (i) by adding conductive fillers to a non-conductive and solvent-soluble polymer, mixing the fillers with the polymer, and forming the mixture into fiber, or (ii) by coating, metal plating or vapor depositing a fibrous material formed from a non-conductive and solvent-soluble polymer with a conductive coating agent;

a method comprising the steps of: preparing a composite fiber comprising a solvent-soluble polymer and a conductive material, and removing the polymer by burning or carbonizing; and others. Thus obtained fibrous metal material may be further accumulated to form a sheet.

In addition, in the method of above-mentioned (1) to (5), from the viewpoint of improving the adhesive property between the active material and materials having a fiber-like network, as well as inhibiting loss of active materials from the sheet, it is useful to configure fibers to have irregularity in the cross section or to have a concavo-convex shape on their surface. It is possible to give fibers an irregularity shape in the cross section by a known method, such as a change in nozzle shape at the time of the spinning. Moreover, it is also possible to give fibers a concavo-convex shape on the fiber surface by a known method, for example, by mixing particles into fiber solution, and then removing the particles from the fibers later, or by plasma-treating fibers.

[Sheet (B)]

On the other hand, the sheet (B) which constitutes the conductive sheet of the present invention comprises fibers having a diameter of 3 μm or smaller. When the diameter of each fiber exceeds 3 μm, the fiber density of the sheet is too small to achieve sufficient charge collecting property, resulting in increase in internal resistance. Further, such a sheet may have a reduced effect for preventing loss of active materials from the sheet.

Moreover, each of the fibers constituting the sheet (B) may have a fiber diameter of preferably 2 μm or smaller, and more preferably 1 μm or smaller. Although the minimum value of the fiber diameter is not specifically limited, from a viewpoint of strength, handling ability or productivity, the fiber may have a fiber diameter of, for example, 0.03 μm or greater, preferably 0.1 μm or greater, and more preferably 0.3 μm or greater.

In order to fill a conductive sheet with active materials and to prevent active materials from escaping from the sheet, the fibers constituting the sheet (B) (or "sheet (B) fibers") preferably have a smaller diameter than the fibers constituting a sheet (A) (or "sheet (A) fibers"). For example, the fiber diameter of the sheet (B) fibers may be ½ or smaller, preferably ⅓ or smaller relative to the fiber diameter of the sheet (A) fibers. Moreover, although the fiber diameter of the sheet (B) fibers may be suitably decided depending on the fiber diameter of the sheet (A) fibers, the fiber diameter of the sheet (B) fibers is 1/10 or greater relative to the fiber diameter of the sheet (A) fibers in many cases.

Further, since the sheet (B) may not support active material, the thickness of a sheet (B) is not limited to a specific one. The sheet (B) may have a thickness, for example, 20 μm or smaller, preferably 10 μm or smaller, and more preferably 5 μm or smaller, in order to reduce battery volume.

Moreover, the ratio of the thickness of the sheet (B) relative to the sheet (A) can be suitably selected depending on the thickness of the sheet (A) and the sheet (B), and the thickness ratio "(Sheet B)/(Sheet A)" may be, for example, 1/200 to ⅕, preferably 1/150 to ⅛.

On the other hand, although the sheet (B) can be produced by the same method as the sheet (A), since the sheet (B) comprises fibers having a smaller diameter, the sheet (B) can be advantageously obtained by electro-spinning method or meltblown method. The fiber diameter of the sheet obtained by electro-spinning method is suitably adjusted depending on polymers to be used or spinning conditions, and the sheet comprising fibers having a fiber diameter of 1 μm or smaller can be easily obtained. The kinds of polymers to be used is not limited to a specific one as long as the polymers are soluble to a solvent, preferable examples of the solvent-soluble polymer include polyvinylidene fluorides, polyamides, polypropylenes, and polyesters in view of their good chemical stability to electrolyte and/or good redox stability. Moreover, polyacrylonitriles can be preferably used as polymers capable of obtaining conductivity by carbonizing.

On the other hand, the sheet comprising fibers having a fiber diameter of about 0.5 to 5 μm can be obtained by meltblown method, and the polymer to be used in the meltblown method may be preferably a melt-processable polymer, for example, polypropylenes, and polyesters.

In many cases it is difficult to perform an electro-spinning method or a meltblown method by using a conductive polymer or a non-conductive polymer which comprises conductive fillers to be kneaded. Accordingly, as an advantageous method, there may be mentioned a method comprising the steps of forming a sheet by using a readily-processable polymer, and plating or vapor depositing the obtained sheet.

[Conductive Sheet]

The conductive sheet of the present invention comprises at least one sheet (A) and at least one sheet (B), the sheets (A) and (B) both having conductivity, and each comprising conductive fibers which are subjected to an electrically conductive treatment on the fiber level.

In view of stable charge collecting property, the conductive sheet related to the present invention requires to have a surface resistance of 10 $\Omega$/sq or lower, preferably 1 $\Omega$/sq or lower, and more preferably 0.1 $\Omega$/sq or lower on both surfaces, wherein the sheet (A) is laminated to the sheet (B).

As described above, the conductive sheet of the present invention can be produced by giving individual sheets (A) and (B) conductivity and overlaying or laminating the conductive sheet (A) on or to the conductive sheet (B). Alternatively, the conductive sheet of the present invention can be also produced by overlaying or laminating a non-conductive sheet (A) on or to a non-conductive sheet (B) and giving the obtained laminated object conductivity by metal plating, evaporating or carbonizing. In this case, as the means for metal plating, vapor deposition, or carbonization, the various methods mentioned above in the item of the sheet (A) can be used suitably.

From the viewpoints, such as the stability of the production process of fibers and sheets, lower cost, and the handling ability of sheets, the most desirable embodiment is a method comprising the steps of: making a paper (equivalent to a sheet (A)) from cut fibers (e.g., fiber length of about 0.5 to 20 mm, preferably about 1 to 10 mm) of a non-conductive polymer (for example, polyesters etc.); electro spinning of a solvent-soluble polymer (for example, polyvinylidene fluorides etc.) to form an ultrafine fiber sheet (equivalent to a sheet (B)) on the paper; laminating the paper to the ultrafine fiber sheet by thermal compression bonding, and plating or vapor depositing a metal on the obtained laminated object.

The above method can provide a wide range of choices of fibers, thereby allow manufacturers to choose sheets having high binding affinity with each other. Further, since the method can convert molten ultrafine fiber directly into web on the sheet corresponding to the sheet (A), the adhesive strength between sheets is improved.

In addition, the layered structure of the conductive sheet of the present invention is not limited to a structure consisting of a sheet (A) and a sheet (B) overlaid with each other, but also can comprise a three-layered structure consisting of a sheet (A), a sheet (B) and a sheet (A) overlaid in this order, wherein each of the sheets (A) placed on both side of the sheet (B) is filled with active materials.

Moreover, the conductive sheet of the present invention may have an apparent specific gravity of, for example, about 0.1 to 0.4 g/cm$^3$, preferably about 0.15 to 0.35 g/cm$^3$, and more preferably about 0.2 to 0.3 g/cm$^3$.

[Electrode]

The electrode of the present invention can be obtained by preparing a conductive sheet as described above and subjecting the conductive sheet to contain active material therein. The electrode may be used in the form of an active-material-deposited sheet comprising constituent fibers coated with active material by vapor deposition or the like, or may be used in the form of an active-material-filled sheet comprising a conductive sheet in which the internal portion of the conductive sheet (especially sheet (A)) is filled with active materials. Moreover, another embodiment of the electrode of the present invention includes an electrode comprising a conductive sheet and particulate active materials in which fibers of the conductive sheet are coated with an active material by vapor deposition or the like, and then the conductive sheet is filled with the particulate active materials.

(Active-Material-Filled Sheet)

As examples of the active material used for the electrode of the present invention, there may be mentioned activated carbons. The electrode filled with activated carbons is suitably used as, for example, polarized electrodes for electric double layer capacitors.

Moreover, as another example of active materials, there may be mentioned negative-electrode active materials capable of storing and emitting lithium ions. Examples of the negative-electrode active materials may include carbon materials, such as graphites and hard carbons, silicon and silicon compounds, tin and tin compounds, and germanium compounds, and at least one can be chosen from these materials. The electrode filled with negative-electrode active materials is suitably used as a negative electrode of lithium-ion secondary batteries.

When the conductive sheet is filled with active materials, the configuration of the active material is not limited to a specific one as long as the active material can be used to fill the conductive sheet. The conductive sheet may be directly filled with particulate active materials, or may be filled with a paste comprising active materials in dispersion. Furthermore, as long as the conductive sheet can contain a predetermined amount of active materials, known methods, such as gas-phase processes, such as vacuum deposition techniques, gas deposition methods, and CVDs, and wet processes may be used. Among them, from the viewpoint of simplicity of the process, it is desirable to directly fill pores of the conductive sheet with powdery or particulate active materials.

When a conductive sheet is filled with particulate active materials, the average particle size of the active material can be selected from the wide range between 0.1 and 100 μm, and preferably between 1 and 50 μm, and more preferably between 0.5 and 80 μm.

Moreover, the amount of particulate active materials to be loaded can be suitably determined depending on the kind of active materials, and the amount may be about 30 to 250 g/m$^2$, preferably about 50 to 200 g/m$^2$, and more preferably about 80 to 150 g/m$^2$.

In the active-material-filled sheet, active materials may be fed in any of the sheet (A) and the sheet (B), but larger amount of active materials are usually loaded in the sheet (A) having larger amount of pores than the sheet (B) having smaller amount of pores. The conductive sheet comprising active materials in the sheet (A) realizes a desirable electrode performance.

When directly filling pores of a conductive sheet with particulate active materials, it is desirable to perform dry process from a viewpoint of simplicity of the process, and examples of the dry process may include a method of filling a conductive sheet with active material fine particles by spraying the particles with an air current on the sheet (A) side, or a method of filling a conductive sheet with active materials by constant feeding the active materials, and others.

(Active-Material-Deposited Sheet)

On the other hand, when the electrode of the present invention comprises a sheet in which at least a part of constituent fibers in the sheet is coated by at least a part of active material, such a sheet may be called as "active-material-deposited sheet". The active material used for coating the fiber surface may be a negative-electrode active material being capable of storing and emitting lithium ions. Examples of the negative-electrode active material may include silicon and silicon compounds, tin and tin compounds, and germanium compounds, and at least one material can be chosen from these examples. Among them, silicon and especially silicon alloys are desirable because they contribute to high capacity. The electrodes further filled with the negative-electrode active materials are suitably used as a negative electrode of a lithium-ion secondary battery.

As a method to coat surface of constituent fibers of the conductive sheet with active material, there may be mentioned a method comprising the step of: depositing active material on a conductive sheet by means of known gas-phase process (such as, vacuum deposition methods, gas deposition methods and CVDs) or known wet processes. In view of process simplicity, the preferable methods include depositing active material on a conductive sheet obtained by the above-mentioned method (3). The thickness of deposited active material to coat the sheet can be selected depending on cell formulation or configuration, and the thickness may be, for example, 50 nm to 10 μm, preferably of 50 nm to 1 μm, and more preferably of 55 to 80 nm from the viewpoint of the balance between the capacity and the cycle characteristics.

If necessary, the active-material-filled sheet and the active-material-deposited sheet may be pressed after feeding active material to them so as to enhance the unity between the sheet (A) and the sheet (B) in the electrode as well as to enlarge the amount of active materials stored in the sheet (A).

Preferably, the apparent specific gravity of thus obtained active-material-deposited sheet may be adjusted by pressing the sheet in consideration of the relaxation space required for expansion of active materials. Thus obtained electrode according to the present invention is suitably used as electrodes of storage devices.

In addition, although a binder and an auxiliary conducting agent may not be essentially used in the present invention, if needed, it is also possible to use an auxiliary conducting agent and/or a binder which are generally used together with active material.

As stated above, the conductive sheet of the present invention is applicable to devices using active materials, such as positive electrodes of lithium-ion secondary batteries, positive or negative electrodes of lithium ion capacitors, and others, in addition to polarized electrodes for electric double layer capacitors and lithium-ion-secondary-battery negative electrodes. The conductive sheet may be used as an electrode by filling or depositing the conductive sheet with active material(s) selected in accordance with each of the intended use.

EXAMPLES

Hereinafter, the present invention will be demonstrated by way of some examples that are presented only for the sake of illustration, which are not to be construed as limiting the scope of the present invention. It should be noted that in the following Examples, physical properties of the Examples were evaluated in the following manners.

[Fiber Diameter of Sheet (A)]

The fiber diameter was calculated as a function of the fineness of fiber in the sheet (A).

[Thickness of Sheet (A)]

The thickness of sheet (A) was determined with a microphotograph of the cross section of the obtained conductive sheet.

[Apparent Specific Gravity of Sheet (A)]

The apparent specific gravity of sheet (A) was calculated as a function of the basis weight and thickness of the sheet (A).

[Fiber Diameter of Sheet (B)]

In the scanning electron microscope (SEM) photograph of the cross section of the sheet (B), 30 fibers were chosen randomly from the image on negative, then the diameters of these fibers were measured with a digitizer, and the average diameter of the fibers was calculated.

[Comparison of Apparent Specific Gravity Between Sheet (A) and Sheet (B)]

In the scanning electron microscope photograph of the cross section of the conductive sheet, the apparent specific gravities between sheet (A) and sheet (B) were compared using an index of multiplication of "the proportion of fiber per area in the conductive sheet" and "the specific gravity of the polymer constituting each sheet".

[Measurement of Surface Resistance]

The conductive sheet was left at a temperature of 20° C. under 65% of humidity for 24 hours or longer in order to condition the humidity of the sheet. Samples each having 2 cm length and 1 cm width were collected from the conditioned sheet, and the resistance (Ω) of the each sample was measured with having applied the voltage of 10 V between both ends of the sample by using a resistance measurement machine available from Yokogawa-Hewlett-Packard Company, under the trade name of "MULTIMETER". Then the surface-resistance value of the each sample was calculated according to the following formula:

"Surface-resistance" (Ω/sq.)="$R$"×("$W$"/"$L$")

R: the resistance (Ω) of a sample,
W: the width of the sample (i.e., 1 cm), and
L: the length of the sample (i.e., 2 cm).

This measurement was performed on 25 samples, and the average value was adopted as the surface resistance of the samples from the sheet.

Example 1

(Production of Conductive Sheet)

A sheet (A) having a basis weight of 20 g/m$^2$, an apparent specific gravity of 0.2 g/cm$^3$, and a thickness of 105 μm was produced by paper-making method using 70 parts of polyester cut fibers having a fineness of 1.0 dtex (diameter of 10 μm) and a fiber length of 5 mm, and 30 parts by weight of composite fibers having a sheath-core structure (available from Kuraray co. Ltd. under the trade name of "N720") comprising a polyester as the core component and a modified polyester as the sheath component.

Subsequently, polyvinylidene fluoride ultrafine fibers were sprayed on one side of the sheet (A) by electro spinning to form an ultrafine-fibrous-sheet (B) on the sheet (A). In the procedure of the electro spinning, the above-mentioned sheet (A) was placed on the target of the electro spinning device, and a solution containing the polyvinylidene fluoride dissolved in DMF (concentration: 5%) was put into the syringe of the device. Then, the voltage of 20 kV was applied between the syringe tip and the target during the spinning so as to form a layer with a thickness of 2 μm made from polyvinylidene-fluoride fibers having a diameter of 0.5 μm on the sheet (A), thereafter, the sheet (A) and sheet (B) was subjected to thermal compression bonding to produce a laminated sheet.

Subsequently, metal copper (Cu) was plated on the laminated sheet by non-electrolyzed plating to obtain a conductive sheet (metal-plating thickness: 1 to 2 μm). Thus obtained conductive sheet had surface resistances of 0.02 Ω/sq and 0.08 Ω/sq., on the sheet (A) and the sheet (B), respectively. The apparent specific gravity of the conductive sheet after metal plating was 0.24 g/cm$^3$. Moreover, the observation of the cross section of the conductive sheet revealed that the apparent specific gravity of the sheet (B) was larger than that of the sheet (A). Moreover, the thickness of the sheet (A) in the obtained conductive sheet was 98 μm, and the apparent specific gravity of the sheet A was 0.21 g/cm$^3$ (fiber volume content of 15.2%).

(Production of Electrode)

The obtained sheet was placed the polyvinylidene-fluoride layer down, and artificial graphite powders (the average particle size of 15 μm) were supplied at a constant feeding rate onto the upper side (i.e., the sheet (A) side) of the conductive sheet under a slight vibration until pores of the conductive sheet were filled with the powders in an amount of 100 g/m$^2$. Thereafter, the obtained product was pressed with flat plates at a heating temperature of 120° C. to obtain an electrode having a thickness of 90 μm in which the charge collecting layer and the active material layer were integrated with each other.

(Production of the Lithium-Ion Secondary Battery for Evaluation)

In order to evaluate the charge and discharge characteristics of the electrode obtained, a lithium-ion secondary battery comprising this electrode as a negative electrode was produced. The lithium-ion secondary battery produced for evaluation comprised a lithium foil as the opposite electrode, a non-aqueous electrolyte solution in which lithium hexafluorophosphate was dissolved in a mixture of ethylene carbonate and 1,2-dimethoxyethane with a ratio of 1/1 (volume ratio) at a concentration of 1 mol/L, and a fine porous film with a thickness of 30 μm made from polyethylene as a separator.

After leaving thus produced lithium-ion secondary battery at room temperature overnight, the battery was charged with constant current of 1 mA using the testing set of charge and discharge for the secondary battery available from Nagano Ltd., until the cell voltage of the test cell reached 0 V. Then, the battery was charged with a decreased current so that the cell voltage was kept at 0V. The charge of the battery was terminated when the current value reached less than 20 μA. Thereafter the battery was discharged with the constant current of 1 mA, and the discharge was terminated when the cell voltage exceeded 1.8 V to calculate the discharged capacity.

The above-mentioned operation was repeated, and the charge-discharge test of 10 cycles was performed with the lithium-ion secondary battery for evaluation. The results revealed that the battery had a charging-capacity in the first cycle of 330 mAh/g, a discharging-capacity in the first cycle of 315 mAh/g, a discharge and charge efficiency in the first cycle of 95.5%, a discharged capacity at 10th cycle of 310 mAh/g, and a cycle retention rate after 10 cycles of 98.4%, and it was confirmed that the lithium-ion secondary battery was excellent in the discharge and charge efficiency in the first cycle as well as the cycle performance.

Example 2

(Production of Conductive Sheet)

On the side of the sheet (A) produced in the same way as Example 1, a polypropylene sheet (B) with a diameter of 3 μm and a thickness of 10 μm produced by meltblown method was overlaid, and the sheet (A) was laminated to the sheet (B) by thermal compression bonding.

Subsequently, metal copper (Cu) was plated on the laminating sheet with non-electrolyzed plating to obtain a conductive sheet (metal-plating thickness: 3 μm). Thus obtained conductive sheet had surface resistances of 0.06 Ω/sq and 0.08 Ω/sq., on the sheet (A) and the meltblown sheet (B), respectively. The apparent specific gravity of the conductive sheet after metal plating was 0.21 g/cm$^3$. Moreover, observation of the cross section of the conductive sheet revealed that the apparent specific gravity of the sheet (B) was larger than that of the sheet (A). Moreover, the thickness of the sheet (A) of the conductive sheet was 98 μm, and the apparent specific gravity of sheet A was 0.21 g/cm$^3$ (fiber volume content of 15.2%).

An electrode and a lithium ion battery were produced by using the conductive sheet in the same way as Example 1 and evaluated. The evaluation revealed that the battery was excellent and had a charging capacity in the first cycle of 318 mAh/g, a discharging capacity in the first cycle of 298 mAh/g, a discharge and charge efficiency in the first cycle of 93.7%, a discharge capacity at 10th cycle of 291 mAh/g, and a cycle retention rate after 10 cycles of 97.7%.

Example 3

(Production of Electrode)

On the conductive sheet produced in the same way with Example 1, an elementary silicone (Si) was deposited by vacuum deposition to produce an electrode. The silicon used as vapor deposition source was silicon powders with 200 to 300 mesh and purity of 99.999%, and the thickness of the deposited layer was approximately 1000 Å (0.1 μm). Thereafter, the obtained product was pressed with flat plates at a heating temperature of 120° C. to obtain an electrode having a thickness of 20 μm in which the charge collecting layer and the active material layer were united with each other.

(Production of the Lithium-Ion Secondary Battery for Evaluation)

The charge discharge characteristics of the electrode were evaluated in the same way as Example 1. The evaluation revealed that the battery had a charging capacity in the first cycle of 1210 mAh/g, a discharging capacity in the first cycle of 980 mAh/g, a discharge and charge efficiency in the first cycle of 81.0%, a discharge capacity at 10th cycle of 900 mAh/g, and a cycle retention rate after 10 cycles of 91.8%, and was an excellent lithium-ion secondary battery with high capacity as well as excellent in the discharge and charge efficiency in the first cycle and in the cycle performance.

Comparative Example 1

Except for producing a sheet (A) having a basis weight of 70 g/cm$^2$, and an apparent specific gravity of 0.70 g/cm$^3$, a conductive sheet was produced in the same way as Example 1. The obtained conductive sheet did not have sufficient space for pores to be filled with active materials, and it was difficult to fill the internal portion of the conductive sheet with active material particles uniformly.

Comparative Example 2

A conductive sheet was produced by preparing a sheet (A) in the same way as Example 1, and plating the sheet with metal copper without laminating a polyvinylidene-fluoride layer on the sheet (A). Although the conductive sheet had surface resistances of 0.08 Ω/sq and 0.08 Ω/sq on both sides, respectively, the conductive sheet was deteriorated in storing the active materials because active materials were swept out from the sheet during filling the active materials. Moreover, after producing a lithium ion battery in the same way with Example 1, battery performance was evaluated. The evaluation revealed that the battery was insufficient in battery performance because it had a charging capacity in the first cycle of 330 mAh/g, a discharging capacity in the first cycle of 260 mAh/g, and a discharge and charge efficiency in the first cycle of 78.8%. This inferior charge collecting property may be caused by lack in ultrafine-fibrous sheet.

Comparative Example 3

Except for using a polyester spunbond sheet having a diameter of 25 μm in the place of the polypropylene sheet obtained by meltblown method, a conductive sheet was produced in the same way as Example 2. The obtained conductive sheet was deteriorated in storing the active materials because the active materials were swept out from the sheet during filling the active materials.

Comparative Example 4

Except for using a polyester fiber having a diameter of 30 μm and a fiber length of 5 mm as the polyester fiber to be used in the sheet (A), a conductive sheet was obtained in the same way as Example 1. By using the obtained conductive sheet, a lithium ion battery was produced in the same way as Example 1 and evaluated.

During the operating process after filling the active materials, loss of the active materials was noticed. The evaluation of the battery revealed that the battery was deteriorated in battery performance due to having a charging capacity in the first cycle of 310 mAh/g, a discharging capacity in the first cycle of 220 mAh/g, and a discharge and charge efficiency in the first cycle of 71.0%. It is presumed that the battery could not effectively use capacity of the loaded active materials because the conductive paths inside the sheet had a sparse structure.

Example 4

A conductive sheet, an electrode, and a lithium-ion secondary battery for evaluation were produced in the same way as Example 1 except for having changed plating conditions.

Comparative Example 5

A conductive sheet, an electrode, and a lithium-ion secondary battery for evaluation were produced in the same way as Example 1 except for having changed plating conditions.

The evaluation results of Example 4 and Comparative Example 5 were summarized in Table 1. As clearly shown in Table below, the battery performance with the conductive sheet having a higher surface resistance than the range defined in the present invention is inferior.

TABLE 1

|  |  | Example 4 | Comparative Example 5 |
| --- | --- | --- | --- |
| Surface | Sheet (A) | 7 | 40 |
| Resistance | Sheet (B) | 4 | 29 |
| (Ω/sq.) |  |  |  |
| Charging capacity in the first cycle (mAh/g) |  | 330 | 294 |

TABLE 1-continued

|  | Example 4 | Comparative Example 5 |
| --- | --- | --- |
| Discharging capacity in the first cycle (mAh/g) | 310 | 177 |
| Discharge and charge efficiency in the first cycle (%) | 93.9 | 60.2 |

Example 5

Except for filling the conductive sheet with silicon powders having a average diameter of 5 μm at 50 g/m² instead of the artificial graphite powders, an electrode (negative electrode) was produced in the same way as Example 1, and battery performance using the electrode was evaluated similarly.

Comparative Example 6

On the other hand, an electrode (negative electrode) was produced by kneading 70 parts of the same kind of silicon powders, 10 parts of polyvinylidene fluoride as a binder, and 20 parts of carbon powders as an electric conduction agent together, rolling the kneaded mixture to make a sheet, and adhering the sheet to a copper foil. The battery performance using the electrode was evaluated similarly.

The battery performances of Example 5 and Comparative Example 6 were compared in Table 2. It is clear that even if the silicon having a larger volume expansion was used as the negative-electrode active material, the cycle life of the battery is considerably improved by using the electrode of the present invention.

TABLE 2

|  | Example 5 | Comparative Example 6 |
| --- | --- | --- |
| Charging capacity in the first cycle (mAh/g) | 3830 | 3480 |
| Discharging capacity in the first cycle (mAh/g) | 3450 | 1790 |
| Discharged capacity at 10th cycle (mAh/g) | 2750 | 30 |
| Cycle retention rate after 10 cycles (%) | 79.7 | 1.7 |

INDUSTRIAL APPLICABILITY

According to the present invention, since it makes possible to obtain a conductive sheet suitable to be filled with or to be deposited with active material, an active-material layer can be produced using the conductive sheet even without a binder, an auxiliary conducting agent, and a solvent. Such a conductive sheet is useful in various fields in the industry, related to manufacture and usage of the storage devices using active materials, especially lithium-ion secondary batteries and electric double layer capacitors.

As mentioned above, the preferred embodiments of the present invention are illustrated, but it is to be understood that other embodiments may be included, and that various additions, other changes or deletions may be made, without departing from the spirit or scope of the present invention.

What is claimed is:
1. A conductive sheet for an electrode, comprising:
  at least one sheet (A) of fibers having a diameter within the range between 3 and 20 μm, and at least one sheet (B) of fibers having a diameter of 3 µm or smaller laminated to the sheet (A),
wherein
an apparent specific gravity of the sheet (A) is from 0.05 g/cm$^3$ to 0.50 g/cm$^3$, and
the diameter of the fibers of sheet (B) is one half or smaller of the diameter of the fibers of sheet (A),
a thickness of sheet (B) is 20 µm or smaller, and
a surface resistance of the conductive sheet is 10 Ω/sq or lower on both surfaces.

2. The conductive sheet as claimed in claim 1, wherein the sheet (B) is formed by electro-spinning method or meltblown method, and comprises an electrically conductive nonwoven fabric, which comprises an organic polymer as its main component.

3. The conductive sheet as claimed in claim 2, wherein the organic polymer is at least one selected from the group consisting of a polyvinylidene fluoride, a polyamide, a polypropylene, a polyester, and a polyacrylonitrile.

4. The conductive sheet as claimed in claim 1, wherein the fibers of the sheet (A) comprise an organic polymer as a main component.

5. The conductive sheet as claimed in claim 1, wherein an apparent specific gravity of sheet (B) is greater than the apparent specific gravity of sheet (A).

6. An electrode comprising:
the conductive sheet of claim 1 and
an active material,
wherein
(i) the active material is filled in pores between constituent fibers in at least sheet (A),
(ii) the active material coats constituent fibers of at least sheet (A); or
(iii) the active material is filled in pores between constituent fibers and coats constituent fibers of at least sheet (A).

7. The electrode as claimed in claim 6, wherein the active material is a particulate which is between constituent fibers of at least sheet (A).

8. The electrode as claimed in claim 6, wherein the active material is a coating of the constituent fibers of at least sheet (A) and the coating is obtained by vapor deposition.

9. The electrode as claimed in claim 6, wherein the active material comprises at least one selected from the group consisting of a carbon material materials, silicon, a silicon compound, tin, a tin compound and a germanium compound.

10. The electrode as claimed in claim 6, wherein
the electrode is a negative-electrode, and
the active material stores and emits lithium ions.

11. The electrode as claimed in claim 6, wherein the electrode is applicable to lithium secondary batteries or electric double layer capacitors.

12. A conductive sheet for an electrode having a surface resistance of 10 Ω/sq or lower on both surfaces, the conductive sheet comprising:
a sheet (A) and
a sheet (B) laminated to the sheet (A),
wherein
the sheet (A) comprises fibers having a diameter of larger than 4 µm and not larger than 15 µm,
an apparent specific gravity of the sheet (A) is 0.05 g/cm$^3$ to 0.40 g/cm$^3$
the sheet (B) comprises fibers having a diameter of 3 µm or smaller,
and
the fiber diameter of fibers in the sheet (B) are one third or less than the diameter of the fibers in the sheet (A).

13. The conductive sheet of claim 1 wherein a thickness ratio of the sheet (B) to the sheet (A) is from 1/200 to 1/5.

14. The conductive sheet of claim 1, comprising a three layer structure consisting of:
2 (A) sheets; and
a (B) sheet;
wherein the sheets are overlaid in the order: sheet (A), sheet (B), sheet (A).

15. The conductive sheet of claim 14 wherein each of the (A) sheets comprises active materials.

* * * * *